(12) United States Patent
Elmasry et al.

(10) Patent No.: US 11,184,950 B1
(45) Date of Patent: Nov. 23, 2021

(54) INCORPORATING CO-SITE INTERFERENCE IN DYNAMIC SPECTRUM ACCESS SYSTEMS WITH MINIMAL COMPUTATIONAL NEEDS

(71) Applicant: Rockwell Collins, Inc., Cedar Rapids, IA (US)

(72) Inventors: George F. Elmasry, San Marcos, CA (US); Thomas L. Tapp, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 89 days.

(21) Appl. No.: 16/805,227

(22) Filed: Feb. 28, 2020

(51) Int. Cl.
  *H04W 4/00* (2018.01)
  *H04W 84/18* (2009.01)
  *H04W 72/04* (2009.01)
  *H04L 5/00* (2006.01)

(52) U.S. Cl.
  CPC ........... *H04W 84/18* (2013.01); *H04L 5/0007* (2013.01); *H04L 5/0073* (2013.01); *H04W 72/0406* (2013.01); *H04W 72/0453* (2013.01)

(58) Field of Classification Search
  CPC ............ H04W 84/18; H04W 72/0453; H04W 72/0406; H04L 5/0007; H04L 5/0073
  USPC ................. 370/329–330, 335–345, 347–348
  See application file for complete search history.

(56) References Cited

U.S. PATENT DOCUMENTS

| | | | |
|---|---|---|---|
| 9,451,627 B1* | 9/2016 | Zhu | H04W 16/14 |
| 10,050,817 B2* | 8/2018 | Terry | H04L 27/2614 |
| 10,070,422 B2 | 9/2018 | Yu et al. | |
| 2004/0095907 A1* | 5/2004 | Agee | H04B 7/0417 370/334 |
| 2005/0250468 A1 | 11/2005 | Lu et al. | |
| 2006/0167784 A1* | 7/2006 | Hoffberg | G06Q 50/188 705/37 |
| 2007/0087694 A1* | 4/2007 | Jin | H04B 7/0617 455/63.1 |
| 2010/0248736 A1* | 9/2010 | Hulkkonen | H04W 16/14 455/452.2 |

(Continued)

FOREIGN PATENT DOCUMENTS

| | | |
|---|---|---|
| GB | 2507443 B | 7/2014 |
| WO | 2013049136 A1 | 4/2013 |

*Primary Examiner* — Thai D Hoang
(74) *Attorney, Agent, or Firm* — Suiter Swantz pc llo

(57) ABSTRACT

A system and method for incorporating co-site interference impact in dynamic spectrum access for heterogeneous hierarchical networks where preprocessing is used to create lookup tables for the different types of co-site interference. The lookup tables reflect the weight of the spectral leakage lobes for all signals internal and external to the system under different conditions. Lookup tables can be used at any hierarchical entity that offer dynamic spectrum access services in a cloud services construct. Co-site interference impact becomes its own set of dynamic spectrum access services that can be added to a dynamic spectrum access capable system without impacting the other dynamic spectrum access computations needs such as computation that produce spatial separation. Co-site interference becomes a second order spatial separation that is abstracted in lookup tables and adaptable based on measured metrics such that different lookup tables can be used under different conditions.

15 Claims, 6 Drawing Sheets

(56) References Cited

U.S. PATENT DOCUMENTS

| | | | |
|---|---|---|---|
| 2011/0237243 A1* | 9/2011 | Guvenc | H04W 72/1231 |
| | | | 455/423 |
| 2011/0292890 A1* | 12/2011 | Kulkarni | H04W 72/0426 |
| | | | 370/329 |
| 2011/0294514 A1* | 12/2011 | Kulkarni | H04W 72/0426 |
| | | | 455/450 |
| 2014/0105139 A1 | 4/2014 | Tomici et al. | |
| 2014/0310243 A1* | 10/2014 | McGee | G06F 16/27 |
| | | | 707/639 |
| 2014/0328423 A1* | 11/2014 | Agee | H04W 24/02 |
| | | | 375/267 |
| 2016/0345310 A1* | 11/2016 | Hunukumbure | H04W 72/0453 |
| 2017/0086281 A1* | 3/2017 | Avrahamy | B01D 61/147 |
| 2020/0220746 A1* | 7/2020 | Shribman | G06F 9/45545 |
| 2020/0344084 A1* | 10/2020 | Shribman | H04L 61/1511 |
| 2020/0356618 A1* | 11/2020 | Shribman | H04L 67/02 |

* cited by examiner

| MAIN LOBE | FIRST HARMONIC | SECOND HARMONIC | THIRD HARMONIC | FOURTH HARMONIC | FIFTH HARMONIC |
|---|---|---|---|---|---|
| 8 | 16 | 4 | 2 | 1 | 0 |

FIG.5

INCORPORATING CO-SITE INTERFERENCE IN DYNAMIC SPECTRUM ACCESS SYSTEMS WITH MINIMAL COMPUTATIONAL NEEDS

BACKGROUND

Co-site interference, interference among geographically separated platforms operating in similar spectrums, is a significant problem in dynamic spectrum management, especially among mobile platforms. Some signal designs intentionally create higher power leakage outside of the signal baseband. The Fourier transform of the signal has infinite extent in the frequency domain. In military networks, a dedicated tactical dynamic spectrum access controller can become the focal point of dynamic spectrum access implementation because of the criticality of central policies. In commercial systems, most platforms are the end-user devices where co-site interference mitigation techniques rely on the base station selection of frequency, orthogonality, and chip code to optimize the spectrum use of the up-link to the base station and the down-link from the base station to the end users. Co-site interference mitigation techniques for commercial cellular systems are ineffective for military communications where each mobile platform (a soldier, a vehicle, an aircraft, a large aircraft carrier, etc.) is a node in the mobile ad-hoc network (MANET) that can have more than one waveform and can be in more than one network. MANET systems can encounter different types of co-site interference within the system and from external systems. Military communications platforms can have many types of antennas that can make co-site interference calculation more complicated than in commercial systems where the end-user devices tend to have a single antenna.

The impact of co-site interference is well studied. Dynamic spectrum management requires significant computational complexity for fusion and decision making. It would be advantageous if the impacts of co-site interference could be included when performing dynamic spectrum management.

SUMMARY

In one aspect, embodiments of the inventive concepts disclosed herein are directed to a system and method for incorporating the impacts of co-site interference into dynamic spectrum management. The impacts of co-site interference are compiled into lookup tables for various spectrum access scenarios. A weighted, cognitive analysis of spectrum usage, theater geographical dispersity and terrain, node properties, and the use of preprocessing can create dynamic spectrum allocation that mitigate co-site interference.

In a further aspect, the cognitive analysis is embodied in a cloud-based service. Preprocessing of co-site interference impact allows for the dynamic spectrum access as a set of cloud services to consider co-site impact with limited computational capabilities. Nodes in a network request a service to change operating frequency and the dynamic spectrum access cloud service reply to this service request with new frequency allocation that considers co-site interference impact.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which:

FIG. 5 shows a lookup table of weighted matrix values;

DETAILED DESCRIPTION

Figure 1:
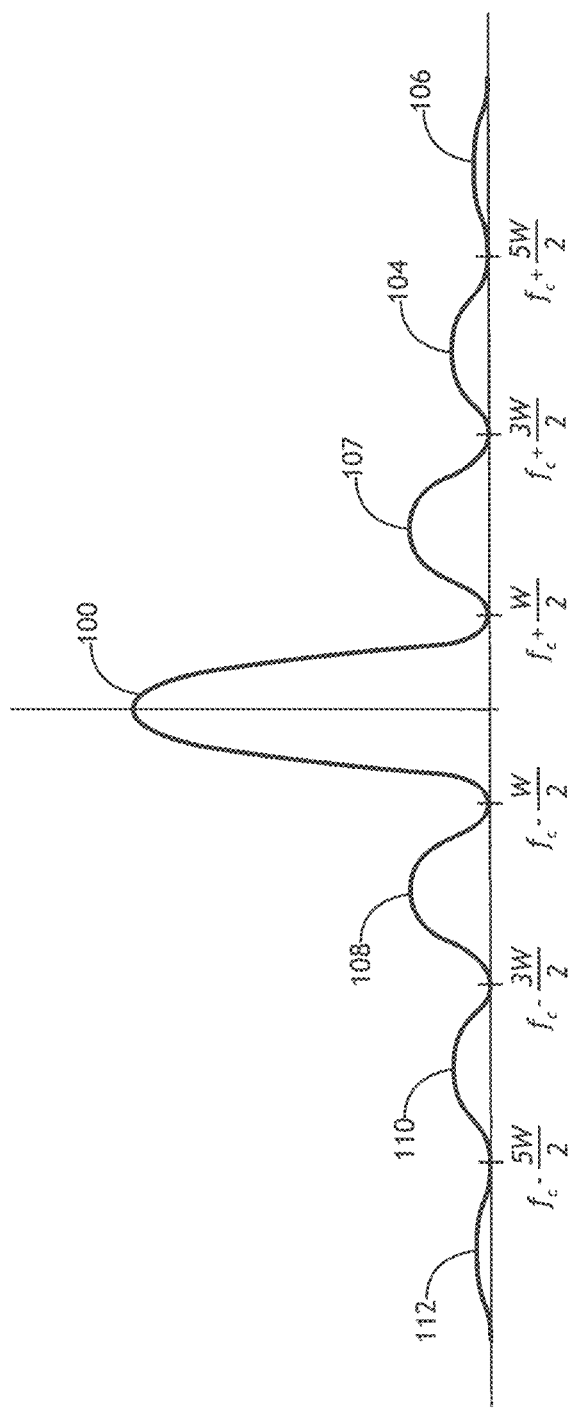
FIG. 1 shows a representation of signal power spectral density with spectral leakage lobes that can cause co-site interference.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method for incorporating the impacts of co-site interference into dynamic spectrum management. The impacts of co-site interference are compiled into lookup tables for various spectrum access scenarios. A weighted, cognitive analysis of spectrum, theater, and node properties, in conjunction with the appropriate look-up tables, determines a spectrum allocation to mitigate co-site interference.

Referring to FIG. 1, a representation of signal power spectral density with spectral leakage lobes that can cause co-site interference is shown. A typical signal with a carrier frequency $f_c$ and bandwidth W defines a main lobe 100 embodying most of the signal energy between $f_c-W/2$ and $f_c+W/2$. Spectral leakage lobes 102, 104, 106, 108, 110, 112 embody a considerable portion of the signal power spectral density in frequency bands outside of the signal's assigned bandwidth. A first set of spectral leakage lobes 102, 108 are in the side lobes between $f_c+W/2$ and $f_c+3W/2$ and between $f_c-W/2$ and $f_c-3W/2$, to the right and left of the main lobe 100 respectively. A second set of spectral leakage lobes 104, 110 are in the side lobes between $$f_c + \frac{3W}{2}$$

and $$f_c + \frac{5W}{2}$$

and between $$f_c - \frac{3W}{2}$$

and $$f_c - \frac{5W}{2},$$

to the right and left of the main lobe 100 respectively.

Any signal has a range of frequencies where most of its power spectrum is located. When designing a communication signal, there are trade-offs with regard to spectral design. A signal that has low spectral density at the sidelobes may have a wide main lobe, resulting in more distortion during channel filtering.

When an antenna module is receiving an RF signal energy over a frequency band that is neighboring to the transmitting frequency band, transmit and receive signals can interfere with each other due to overlap in the first spectral leakage lobes 102, 108. The spectral leakage lobes 102, 104, 106, 108, 110, 112 have diminishing power spectral density. A primary mechanism for avoiding co-site interference is to avoid simultaneous transmit and receive frequencies over the same node in neighboring frequency bands, but co-site interference avoidance in a dynamic spectrum access system must be adapted for a plurality of scenarios.

Figure 2:
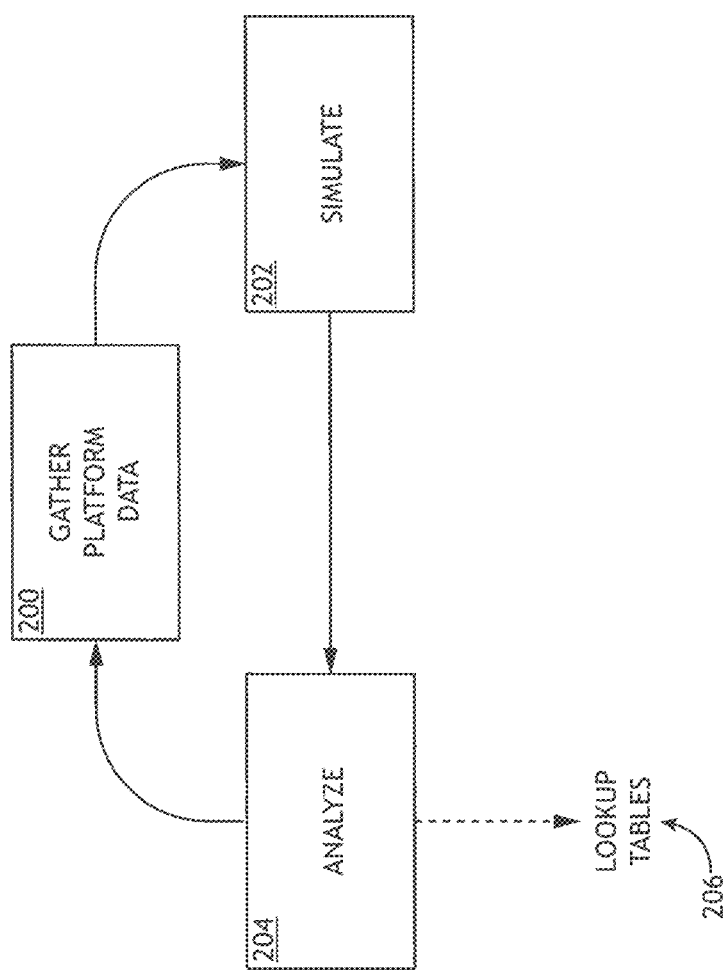
FIG. 2 shows a block diagram of a platform co-site interference analysis according to an exemplary embodiment.

Referring to FIG. 2, a block diagram of a platform co-site interference analysis according to an exemplary embodiment is shown. Data is gathered 200 pertaining to the platform being analyzed. Such data may include antenna locations, emission patterns from each antenna, signals characteristics, a receivers' susceptibility to co-site interference, and antenna coupling. Once the data is gathered 200, the data is delivered to a simulation platform such as Matlab to simulate 202 various frequency interference scenarios based on the data and interference models. The results are then analyzed 204. Data gathering 200 and analysis 204 may be performed at design time.

This process is performed iteratively until a conclusion is reached on how co-site interference occurs over the simulated platform for various values of platform properties. A set of lookup tables 206 are generated and can be used during dynamic spectrum access decision making to quickly determine a spectrum allocation having the best available interference profile. These lookup tables 206 may be generated for each platform and for all the waveforms the platform may use.

In at least one embodiment, the process is repeated for each platform separately and the co-site impact between all possible combinations of waveforms within the available spectrum, and within the capabilities of the platforms, is analyzed.

The lookup tables 206 gathered during simulation allow dynamic spectrum access decisions to make spectrum reallocations that include co-site interference mitigation, without performing any significant real-time analysis for all possible combinations of waveforms that can operate simultaneously on the platform. For large platforms that utilize directional antennas far away from each other, co-site interference may be minimal. For other, smaller platforms utilizing omni-directional antennas, co-site interference can have a large impact on signal performance.

Taking into considerations co-site analysis during the spectrum allocation process may be substantially more efficient with pre-processing to generate the lookup tables 206. These lookup tables 206 allow the dynamic spectrum access decision making process to avoid co-site interference or minimizes co-site interference impact without the need for extensive computational power or delaying the dynamic spectrum access services response time. When assigning frequencies dynamically, extra delay from the computation of co-site analysis in real time can degrade the service by increasing the service response time. Approximation models help the dynamic spectrum access decision making process to consider the critical impact of co-site interferences as part of a multifactor decision-making function. For example, if the spectrum resources pool is limited at any given time, dynamic spectrum access services may allow interference from higher order spectral leakage lobes of another signal to coexist with a new frequency assignment as it is likely to be seen as background noise. The limited spectrum resources pool will limit the options to use other frequencies forcing the dynamic spectrum access decision-making process to tolerate some level of co-site interference.

In at least one embodiment, a cloud-based system may utilize a wireless sensor network where the sensors have limited power consumption and limited processing power, potentially disposed in the platforms utilizing the system. Heuristic algorithms utilize sensor data and platform properties as gathered 200 data to perform the simulations 202 and analysis 204. Frequency assignment de-confliction comprises first order spatial separation. Co-site interference comprises second order spatial separation. The second order spatial separation is considered within the scope of the first order spatial separation.

Figure 3:
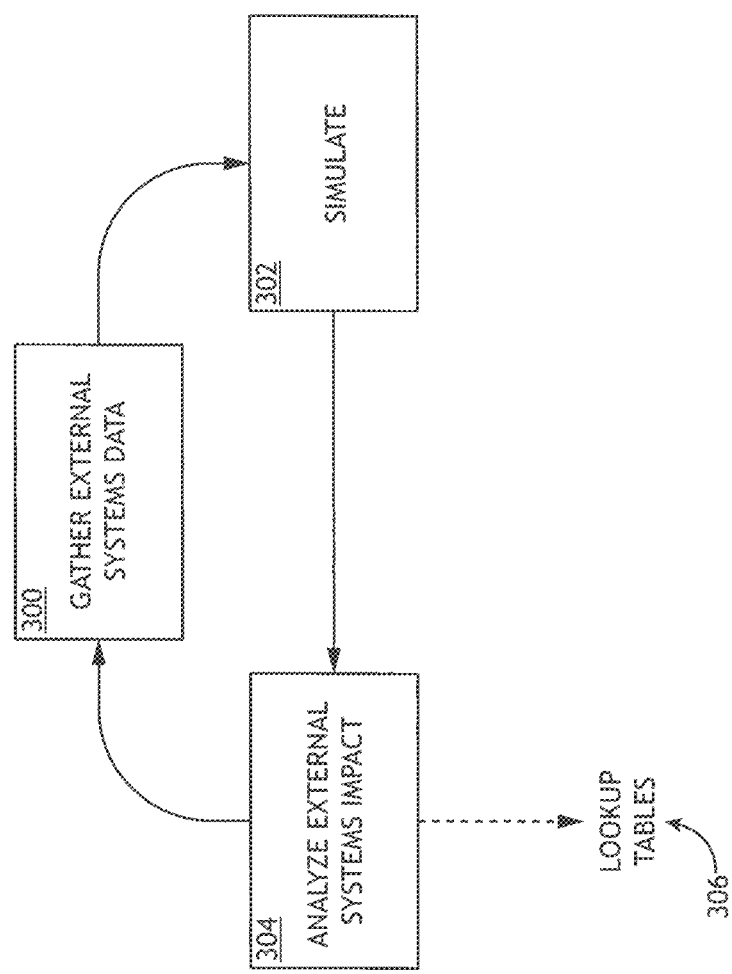
FIG. 3 shows a block diagram of a process for creating co-site interference lookup tables for external systems according to an exemplary embodiment.
Figure 4:
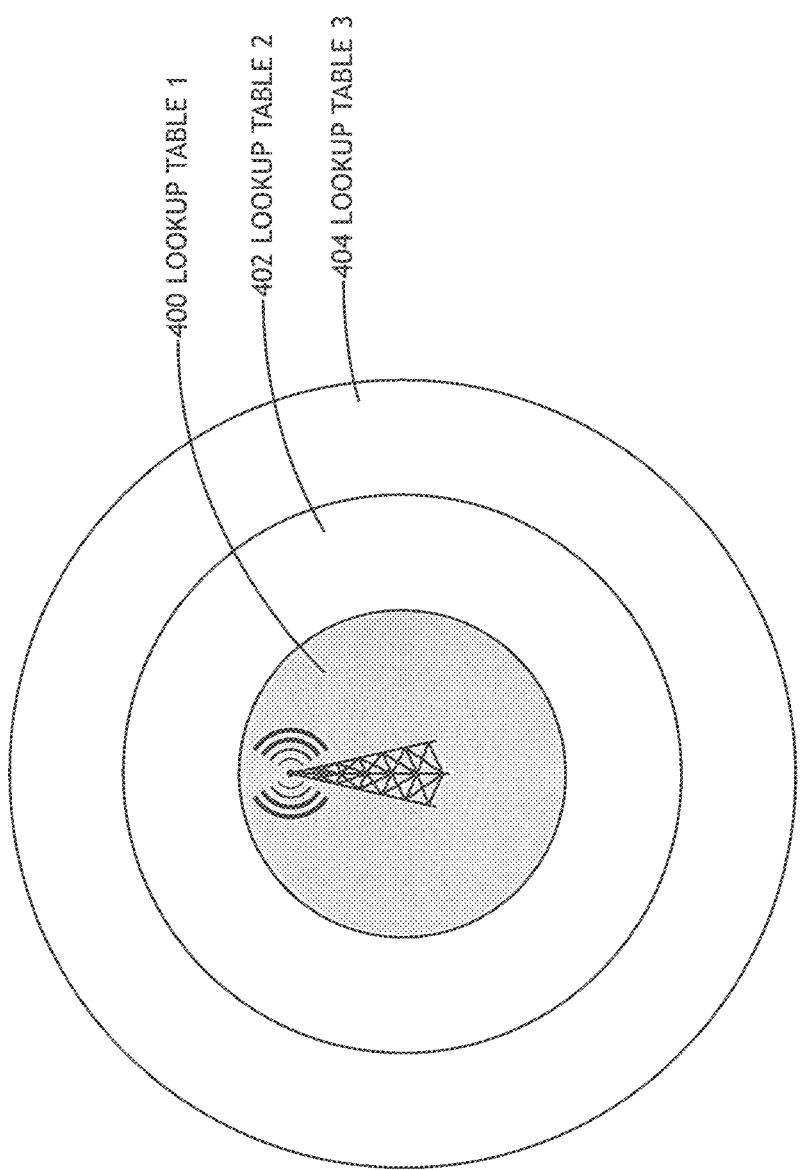
FIG. 4 shows a block representation of different co-site lookup tables for an external system based on distance from an external emitter according to an exemplary embodiment.

Referring to FIGS. 3 and 4, a block diagram of a process for creating co-site interference lookup tables 306 for external systems according to an exemplary embodiment and a block representation of different co-site lookup tables for an external system based on distance from an external emitter according to an exemplary embodiment are shown. In addition to the platform-based co-site interference analysis as in FIG. 2, dynamic spectrum access co-site interference consideration may include the impact of external systems. Data similar to the platform specific data described herein is gathered 300 by interfacing with one or more external systems and obtaining a database of external licensed users, including corresponding locations and signal characteristics.

In at least one embodiment, interference scenarios are simulated 302 based on data from the external system and known models. The results are analyzed 304 to produce or modify a set of lookup tables 306. In at least one embodiment, a dynamic spectrum access service, potentially a cloud-based service, may assign a new frequency to a network or a node with reference to the lookup tables 306 to mitigate co-site interference impact of external systems without performing real-time co-site analysis.

In at least one embodiment, the data gathered 300 may be specific to the type of external system. For example, if the external system is a cellular tower with a defined RF footprint, one or more lookup tables 306 within certain distances 400, 402, 404 from the cellular tower location can be created.

Analyzing 304 the impact of external systems through simulation 302 may have limited accuracy. In at least one embodiment, fine-tuning of the analysis may be performed at run-time. In such embodiments, run-time analysis of the co-site interference metrics may be performed to change the lookup tables 306, 400, 402, 404 used in a certain scenario without the need to perform the preprocessing steps after deploying the system.

In at least one embodiment, dynamic spectrum access services have lookup tables 306, 400, 402, 404 for all possible scenarios and have policies, rule sets, and configuration parameters to change the behavior of dynamic spectrum access cognitive engines regarding co-site interference by selecting another lookup table 306, 400, 402, 404.

Dynamic frequency assignment relies on spatial separation in order to reuse the same frequency such that two networks using the same frequency will not interfere with each other. The dynamic frequency assignment process may spatially separate the geographical areas where the main lobe is emitted for the same frequency. This spatial separation is first order spatial separation. Inter-system co-site interference impact requires considering a second order spatial separation. Spatial separation functions include metrics for minimizing or eliminating co-site interferences internal to the system. Platform co-site analysis comprises one type of second order spatial separation where one signal spectral leakage lobe's impact on another signal main lobe over the same geographical location is considered. Dynamic spectrum access services can also consider second order spatial separation where the managed networks are assigned spatially separated frequencies that prevent interference between the main power spectral lobes and also minimize the impact co-site interference.

Referring to FIG. 5, an exemplary lookup table of weighted matrix values mapping the impact co-site interference of an exemplary signal. The weighted matrix abstracts co-site impact in numbers where higher numbers correspond to a higher impact and lower numbers correspond to a lower impact. Weighted matrix lookup tables may be specific to co-site impact of an external signal, co-site impact on a platform, and/or inter-system co-site impact of the signals that would be created if new frequency allocations were implemented. A weight of zero for a particular lobe indicates negligible impact for that and all higher lobes.

In at least one embodiment, a system (such as a system embodying a cloud based dynamic spectrum access service) stores a collection of weighted matrix lookup tables for registered platforms of the system and potentially for external systems. In addition to the (16, 4, 2, 1, 0) example in FIG. 5, the system may use other lookup tables such as (9, 3, 1, 0), (4, 2, 1, 0), (3, 1, 0), (2, 1, 0), (1, 0), etc., where the data structure is organized with the main lobe value or first harmonic value as the most significant value, and terminating in a zero value. Weighted matrix lookup tables are the outcome of simulation and analysis specific to platform properties. Signal characteristics may produce similar weighted matrix lookup tables. Power spectral density decays exponentially or close to exponentially with higher lobes; different signals have different decay patterns. Some signals are designed for fast power decay while other signals are designed for slow power decay; fast decaying signals may be mapped to a weighted matrix lookup table such as (1, 0) while slow decaying signals may be mapped to a weighted matrix lookup table such as (16, 4, 2, 1, 0).

Signal power may be considered as part of the weighted matrix lookup table. In at least one embodiment, each integer unit of the weighted matrix lookup tables is a function of the signal power. Where two signals have the same decay pattern but different signal power (one emits five watts while the other emits one watt), the weighted matrix lookup tables would not have the same impact values; the co-site interference impact of the five-watt signal would be orders of magnitude greater than the impact of the one-watt signal. In at least one embodiment, the integer values in the weighted matrix lookup tables are normalized to the wattage unit.

In at least one embodiment, for external systems, distances may be mapped to different weighted matrix lookup tables. The impact of an external system co-site interference on functions utilized by the dynamic spectrum access system may be different based on the spatial distance between the system and the geographical location of the external system.

In at least one embodiment, for inter-system co-site interference, the second order spatial separation may use short weighted matrix lookup tables such as (1, 0) because the power spectral density decays fast with distance. The (1, 0) weighted matrix lookup table may cause a system performing spectrum allocation with co-site impact mitigation to consider inter-system co-site impacts only over close proximities.

In at least one embodiment, where dynamic spectrum access is implemented as a set of cloud services, co-site analysis and the corresponding weighted matrix lookup tables comprise an element of the frequency assignment function, along with other parameters and allocation policies. A rigid design that excludes frequency assignments because of co-site interference from higher spectral leakage lobes can lead to in-efficient use of spectrum resources.

In at least one embodiment, co-site interference weights may indicate dB loss impact on the receiver of the signal under consideration. A system may achieve high fidelity by creating a one-to-one relationship between the signal and all the signals that would be created if a new frequency assignment took place. Different signals react to the same level of co-site interference differently. The loss in dB can have a higher impact on one signal than another and can be used as a normalized co-site impact for all cases.

Figure 6:
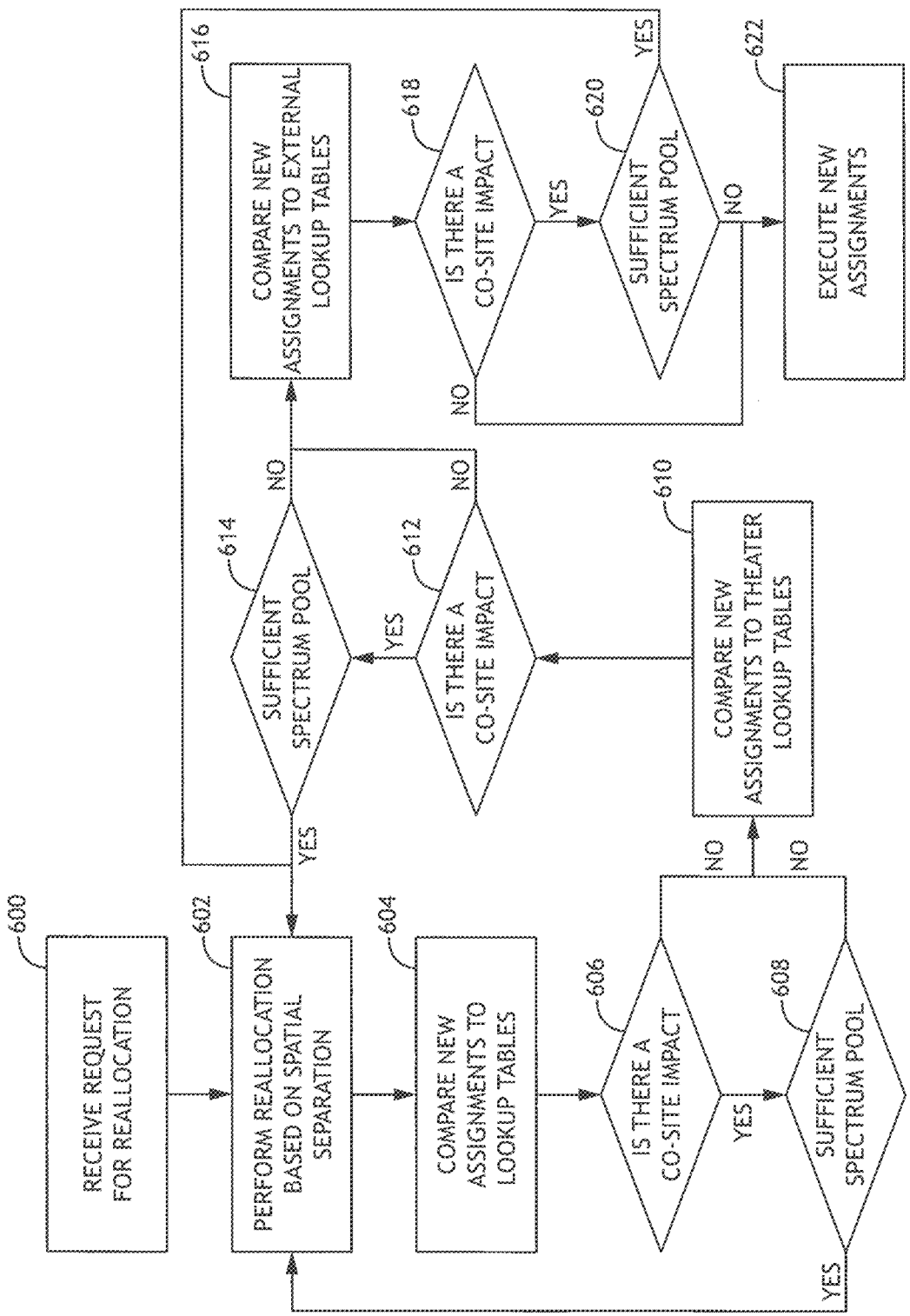
FIG. 6 shows a flowchart of a method for dynamic spectrum management including co-site interference mitigation according to an exemplary embodiment.

Referring to FIG. 6, a flowchart of a method for dynamic spectrum management including co-site interference mitigation according to an exemplary embodiment is shown. A spectrum management system, such as a cloud-based system, receives 600 a request for spectrum (frequency) reallocation. The system performs 602 spectrum reallocation based on spatial separation. Then the new spectrum allocation is compared 604 to co-site lookup tables specific to the platforms under management of the system and identifies the magnitude of any co-site interference. If the system determines 606 a co-site impact is likely, the system determines 608 if the available spectrum pool is sufficient for a different spatial separation-based reallocation. The spectrum pool determination 608 may be embodied in a cognitive process configured to make a weighted comparison of the spectrum pool and the identified co-site impact from the co-site impact comparison 604. For example, a large spectrum pool and a minimal co-site impact may indicate sufficiency for a different spatial separation-based reallocation, while a highly constrained spectrum pool and a moderate co-site impact may indicate insufficiency. It should be appreciated that the cognitive process may the theater or mission specific.

In at least one embodiment, if the cognitive process determines 608 that there are sufficient spectrum resources, a new reallocation is performed 602. If there are insufficient spectrum resources, or if the system determines 606 there is no co-site impact, the system may compare 610 the new spectrum allocation to co-site lookup tables specific to the theater for co-site interference and magnitude. The comparison 610 may place added weight on the distance (or overlap) between main lobes and side lobes in the new spectrum allocation and the theater specific co-site lookup tables. If the system determines 612 a co-site impact to assets in the theater is likely, the system determines 614 if the available spectrum pool is sufficient for a different spatial separation-based reallocation. The spectrum pool determination 614 may be embodied in a cognitive process configured to make a weighted comparison of the spectrum pool and the identified co-site impact from the co-site impact comparison 610.

In at least one embodiment, if the cognitive process determines 614 that there are sufficient spectrum resources, a new reallocation is performed 602. If there are insufficient spectrum resources, or if the system determines 612 there is no co-site impact, the system may compare 616 the new spectrum allocation to co-site lookup tables specific to external systems, potentially received from external sources managing the spectrum for those external systems. The comparison 616 may place added weight on the distance (or overlap) between main lobes and side lobes in the new spectrum allocation and the external system co-site lookup tables for co-site interference and magnitude. If the system determines 618 a co-site impact to external systems is likely, the system determines 620 if the available spectrum pool is sufficient for a different spatial separation-based reallocation. The spectrum pool determination 620 may be embodied in a cognitive process configured to make a weighted comparison of the spectrum pool and the identified co-site impact from the co-site impact comparison 616. If the cognitive process determines 620 that there are sufficient spectrum resources, a new reallocation is performed 602. If there are insufficient spectrum resources, or if the system determines 618 there is no co-site impact, the new spectrum allocation is executed 622.

In at least one embodiment, second order spatial separation is calculated after first order spatial separation produces a set of frequency assignments. The second order spatial separation confirms that the frequency assignment has no or minimal inter-system co-site impact, or alternatively, the co-site interference impact is unacceptable. If the impact is unacceptable, frequency assignments may be adjusted within a range defined according to the first order spatial separation, or a decision can be reached to accept some level of inter-system co-site interference because there aren't enough spectrum resources to overcome the level of interference.

It may be appreciated that first order spatial separation takes precedence over second order spatial separation because co-site interference impact dwindles fast with spatial separation. Second order spatial separation becomes critical when different networks overlay the same geographical area or when narrow band signals are used extensively where spectral leakage lobes have considerable power spectral density.

In at least one embodiment, while the lookup tables are preprocessed, metrics measured in real-time may cause system to select a different lookup table for the same platform, external system, or inter-system co-site. Interference impact is monitored at all the hieratical entities of the network such that lower hierarchical entities provide feedback to higher hierarchical entities to fine tune the spectrum allocation.

In at least one embodiment, a cloud-based service allocating spectrum resources may include reciprocity if a platform is part of two networks such that frequency assignment to one network does not implicate co-site interference from a second network, and vice versa. When assigning a new frequency to a network in a certain area and co-site interference from external system is considered through weighted matrices, the cloud-based service may also consider the impact of frequency assignments to the external systems via a reverse analysis based on the received weighted matrix lookup tables, especially when the external system is a primary user. The cloud-based service may consider the impact of co-site interference of frequencies assigned in the area of operational of the external system. Weighted matrix lookup tables can be used based on the distance from the center of the external system area where higher order lobes may be allowed in the peripherals of the external system area of coverage under conditions such as scarcity of the available spectrum resources pool.

In at least one embodiment, the cloud-based service(s) may comprise a hierarchical set of decision-making functions. In at least one embodiment, higher hierarchy decisions may override lower hierarchy decision; alternatively, or in addition, a hybrid approach may allow lower hierarchical entities to contribute certain scope constrained decisions. For example, at the node level, the node may have weighted matrix lookup tables specific for the platform; the node may check those weighted matrix lookup tables against a new frequency assignment from a higher hierarchy. Checking against these weighted matrix lookup tables can also occur if the decision is reached locally.

A hybrid dynamic spectrum access system may utilize weighted matrix lookup tables at any entity even if it is expected that a higher hierarchy entity will override the lower hierarchy entity decision to provide feedback. Decision feedback may express the amount of tolerated co-site interference in accepting a decision from a higher hierarchy. Such feedback may enable a cognitive-based system of the higher hierarchical entity to refine spectrum allocation parameters. For example, the centralized arbitrator can produce a conclusion through machine learning techniques and using decision feedbacks that a certain platform has lower tolerance to co-site interference. This decision can be produced based on a high ratio of frequency assignments that do not last when co-site interference is tolerated for some reason or another as expressed by the platform decision feedback. Machine learning techniques at the central arbitrator can use the feedback from the platform to adjust a predefined policy. The use of weighted matric lookup tables allows the centralized arbitrator machine learning-based technique to switch to a different matrix for a given platform. For example, if the centralized arbitrator utilized a weighted matrix lookup table (3, 1, 0) for co-site impact, it may switch to a different weighted matrix lookup table (4, 2, 1, 0) in order to increase the weight of the co-site interference impact for this platform and thereby adapt its policy with respect to this platform based on feedback.

In typical military communications systems, co-site interference impact mitigation may be added in incremental steps. The system may first consider the impact on external systems so that primary user rules are not violated. Military communications systems are often deployed overseas where they must share spectrum with commercial systems that operate on different frequency bands. Next, the system may consider platform co-site interference impact as it is likely to have the most co-site impact on frequency assignments. Then, the system may consider external systems co-site interference impact. Finally, the system may consider inter-system co-site interference impact.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form hereinbefore described being merely an explanatory embodiment thereof, it is the intention of the following claims to encompass and include such changes. Furthermore, any of the features disclosed in relation to any of the individual embodiments may be incorporated into any other embodiment.

What is claimed is:
1. A computer apparatus comprising:
one or more external data link connections; and
at least one processor in data communication with a memory storing processor executable code for configuring the at least one processor to:
receive a request for spectrum reallocation from a platform in a mobile ad-hoc-network;
perform a spectrum reallocation based on spatial separation of platforms in the mobile ad-hoc network;
retrieve one or more stored platform co-site interference lookup tables, each comprising a set of co-site interference metrics specific to a corresponding platform in the mobile ad-hoc network;
compare the spectrum reallocation to the one or more stored platform co-site interference lookup tables;
determine if platform co-site interference is likely based on the comparison; and
perform a spectrum reallocation based on spatial separation in a different frequency band when platform co-site interference is likely.

2. The computer apparatus of claim 1, wherein the at least one processor is further configured to determine if a spectrum pool is sufficient to allow the spectrum reallocation based on spatial separation in the different frequency band based on a cognitive process configured to apply a weighted comparison of a magnitude of co-site interference impact to the spectrum pool.

3. The computer apparatus of claim 2, wherein the at least one processor is further configured to:
retrieve one or more stored theater co-site interference lookup tables, each comprising a set of co-site interference metrics specific to a corresponding transmission sources in a theater of operation;
compare the spectrum reallocation to the one or more stored theater co-site interference lookup tables based on a frequency separation of main lobes and side lobes;
determine if theater co-site interference is likely based on the comparison; and
perform a spectrum reallocation based on spatial separation in a different frequency band when theater co-site interference is likely.

4. The computer apparatus of claim 3, wherein the at least one processor is further configured to determine if the spectrum pool is sufficient to allow the spectrum reallocation based on spatial separation in the different frequency band based on a cognitive process configured to apply a weighted comparison of a magnitude of theater co-site interference impact to the spectrum pool.

5. The computer apparatus of claim 3, wherein the at least one processor is further configured to:
receive one or more external co-site interference lookup tables, each comprising a set of co-site interference metrics specific to a corresponding external transmission sources in a theater of operation;
compare the spectrum reallocation to the one or more external co-site interference lookup tables based on a frequency separation of main lobes and side lobes;
determine if external co-site interference is likely based on the comparison; and
perform a spectrum reallocation based on spatial separation in a different frequency band when external co-site interference is likely.

6. The computer apparatus of claim 5, wherein the at least one processor is further configured to determine if the spectrum pool is sufficient to allow the spectrum reallocation based on spatial separation in the different frequency band based on a cognitive process configured to apply a weighted comparison of a magnitude of external co-site interference impact to the spectrum pool.

7. The computer apparatus of claim 1, wherein the platform co-site interference lookup tables comprise weighted matrices of co-site interference impacts corresponding to each harmonic lobe of a specific frequency allocation.

8. A method for incorporating co-site interference impact in dynamic spectrum access comprising:
 receiving a request for spectrum reallocation from a platform in a mobile ad-hoc-network;
 performing a spectrum reallocation based on spatial separation of platforms in the mobile ad-hoc network;
 retrieving one or more stored platform co-site interference lookup tables, each comprising a set of co-site interference metrics specific to a corresponding platform in the mobile ad-hoc network;
 comparing the spectrum reallocation to the one or more stored platform co-site interference lookup tables;
 determining if platform co-site interference is likely based on the comparison; and
 performing a spectrum reallocation based on spatial separation in a different frequency band when platform co-site interference is likely.

9. The method of claim 8, further comprising:
 determining if a spectrum pool is sufficient to allow the spectrum reallocation based on spatial separation in the different frequency band based on a cognitive process configured to apply a weighted comparison of a magnitude of co-site interference impact to the spectrum pool.

10. The method of claim 9, wherein:
 retrieving one or more stored theater co-site interference lookup tables, each comprising a set of co-site interference metrics specific to a corresponding transmission sources in a theater of operation;
 comparing the spectrum reallocation to the one or more stored theater co-site interference lookup tables based on a frequency separation of main lobes and side lobes;
 determining if theater co-site interference is likely based on the comparison; and
 performing a spectrum reallocation based on spatial separation in a different frequency band when theater co-site interference is likely.

11. The method of claim 10, further comprising:
 determining if the spectrum pool is sufficient to allow the spectrum reallocation based on spatial separation in the different frequency band based on a cognitive process configured to apply a weighted comparison of a magnitude of theater co-site interference impact to the spectrum pool.

12. The method of claim 10, further comprising:
 receive one or more external co-site interference lookup tables, each comprising a set of co-site interference metrics specific to a corresponding external transmission sources in a theater of operation;
 compare the spectrum reallocation to the one or more external co-site interference lookup tables based on a frequency separation of main lobes and side lobes;
 determine if external co-site interference is likely based on the comparison; and
 perform a spectrum reallocation based on spatial separation in a different frequency band when external co-site interference is likely.

13. The method of claim 12, further comprising:
 determining if the spectrum pool is sufficient to allow the spectrum reallocation based on spatial separation in the different frequency band based on a cognitive process configured to apply a weighted comparison of a magnitude of external co-site interference impact to the spectrum pool.

14. The method of claim 8, wherein the platform co-site interference lookup tables comprise weighted matrices of co-site interference impacts corresponding to each harmonic lobe of a specific frequency allocation.

15. The method of claim 8, wherein the process steps are distributed as a cloud service in the mobile ad-hoc network.

* * * * *